United States Patent [19]

Taniguchi et al.

[11]  4,388,442
[45]  Jun. 14, 1983

[54] STABILIZER OR DISPERSING AGENT FOR USE IN A SUSPENSION POLYMERIZATION OF A VINYL COMPOUND COMPRISING A MODIFIED AND PARTIALLY HYDROLYZED ANIONIC POLYVINYL ALCOHOL

[75] Inventors: Yasuo Taniguchi; Toshio Asano; Haruo Funami; Kouichi Itou, all of Quni, Japan

[73] Assignee: Denki Kagaku Kogyo Kabushiki Kaisha, Tokyo, Japan

[21] Appl. No.: 195,737

[22] Filed: Oct. 10, 1980

[30] Foreign Application Priority Data

Oct. 13, 1979 [JP] Japan ................ 54-132296
Oct. 13, 1979 [JP] Japan ................ 54-132297
Oct. 23, 1979 [JP] Japan ................ 54-136589
Nov. 28, 1979 [JP] Japan ................ 54-153870

[51] Int. Cl.³ .................. C08F 8/12; C08F 8/36; C08F 8/40; C08F 8/46
[52] U.S. Cl. ........................ 525/60; 524/297; 524/306; 524/322; 525/56; 525/57; 525/58; 525/61; 526/193; 526/200; 526/202; 526/344.2
[58] Field of Search ..................... 525/60, 61

[56]         References Cited
         U.S. PATENT DOCUMENTS 3,702,844 11/1972 Ofstead et al. ............ 525/61
3,925,290 12/1975 Matsuo et al. ............ 525/60

FOREIGN PATENT DOCUMENTS 753546    1/1971  Belgium ................ 525/60
31-7540   8/1956  Japan .
47-13966  4/1972  Japan .
50-66584  6/1975  Japan .
51-47991  4/1976  Japan .
51-21670  7/1976  Japan .
51-21671  7/1976  Japan .
51-25277  7/1976  Japan .
52-5886   1/1977  Japan .
52-21090  2/1977  Japan .
52-152988 12/1977 Japan .
53-102988 9/1978  Japan .
54-31090  3/1979  Japan .

Primary Examiner—Stanford M. Levin
Attorney, Agent, or Firm—Jordan and Hamburg

[57]  ABSTRACT

A stabilizer or dispersing agent for use in a suspension polymerization of a vinyl compound is provided which comprises a modified and partially hydrolyzed polyvinyl alcohol having an average polymerization degree of from 200 to 3,000 and an average hydrolysis degree of from 60 to 90 mol % and including anion hydrophilic groups at the side chains thereof, wherein said anion hydrophilic groups are selected from the group consisting of dicarboxyl groups and/or esters thereof and/or salts thereof, sulfuric esters and/or salts thereof and phosphoric esters and/or salts thereof, and the content of said anion hydrophilic groups is in the range of from 0.02 to 10 mol % per unit mol of the polyvinyl alcohol. A process for preparing a polymer of a vinyl compound is also provided wherein said vinyl compound is polymerized in a suspension thereof suspended by the use of the stabilizer or dispersing agent.

11 Claims, No Drawings

STABILIZER OR DISPERSING AGENT FOR USE IN A SUSPENSION POLYMERIZATION OF A VINYL COMPOUND COMPRISING A MODIFIED AND PARTIALLY HYDROLYZED ANIONIC POLYVINYL ALCOHOL

BACKGROUND OF THE INVENTION

1. Field of the Invention

The present invention relates to a stabilizer or dispersing agent for use in a suspension polymerization, and more particularly to a stabilizer or dispersing agent for use in a suspension polymerization of a vinyl compound and a process for preparing a polymer of vinyl compound by the use of said stabilizer or dispersing agent.

2. Prior Art

In the process for suspending vinyl chloride monomers in water and then polymerizing the same in the presence of a catalyst which is soluble in the monomers, a suspending agent or stabilizer has hitherto been added to the reaction mixture in order to disperse the oily droplets of monomer stably in water and to prevent the formed polyvinyl chloride particles from adhering with each other. For this purpose, polyvinyl alcohol, cellulose derivatives and surfactants are commonly used.

It is well known that polyvinyl alcohol is most frequently used for this purpose, since it functions excellently when used as the suspending agent or stabilizer of this kind. However, the polyvinyl chloride prepared by the use of an unmodified polyvinyl alcohol is poor in porosity which results in reduction of the absorption speed and the amount of a plasticizer, leading to unsatisfactory workability in the later processing steps (for example, gelation at a later processing step is retarded). A further disadvantage of the polyvinyl chloride prepared by the use of an unmodified polyvinyl alcohol resides in that it is difficult to evaporate residual monomers contained in the formed polyvinyl chloride particles due to their poor porosities, resulting in an increase of monomers remaining in the polyvinyl chloride particles.

In order to overcome the aforementioned disadvantages, it has been proposed to use a different kind or combination of dispersing agents to change the interfacial tension and/or the viscosity of the polymerization system to improve the dispersibility thereby to change the shape or size of the formed particles to obtain porous particles. Examples of the previously proposed dispersing agents are polyvinyl alcohol having a hydrolysis degree of 60 to 90 mol%, a modified polyvinyl alcohol including carbonyl groups and having a hydrolysis degree of 60 to 90 mol% (Japanese Patent Provisional Publication No. 31090/1979), and a modified polyvinyl alcohol obtained by partially hydrolyzing a copolymer prepared from vinyl acetate and an unsaturated monocarboxylic acid (Japanese Patent Publication No. 13966/1972). However, these known dispersing agents or stabilizers are not satisfactory in that coarse polyvinyl chloride particles, which are poor in porosity, are formed due to poor dispersibility of the agent, minute polyvinyl chloride particles having too low apparent density are formed due to excessive dispersibility of the agent, or minute polyvinyl chloride particles, which are poor in porosity, are formed.

A further proposal has been made by Japanese Patent Publication No. 7540/1956, in which a partially hydrolyzed product of a copolymer of vinyl acetate and maleic acid anhydride is used as a stabilizer for the suspension. This stabilizer includes more than 40 mol% of maleic acid anhydride and a hydrolysis degree of 1 to 15 mol%. However, since the dispersive power of this stabilizer is not improved that much, the formed polyvinyl chloride particles are still coarse and poor in porosity and thus inferior in absorption of a plasticizer.

Monomers contained in polyvinyl chloride particles are conventionally removed by heating a slurry after the completion of polymerization to recover the monomers under a reduced pressure or by controlling the conditions at the drying step. These conventional methods have been proposed based on the fact that monomers can be easily removed from the polymer particles by heating. However, since polyvinyl chloride tends to be decomposed by the thermal hysteresis, the heating temperature and time are limited. As a consequence, inconsistency occurs in removal of monomers. If monomers are removed at a low temperature, the production efficiency is lowered. On the contrary, if monomers are removed at a high temperature in order to improve the production efficiency, the polyvinyl chloride is decomposed and colored.

There have been methods proposed for producing polyvinyl chloride which resist decomposition and coloring under thermal hysteresis, wherein metallic salts of lower aliphatic carboxylic acids, metallic salts of acrylic acid or bisphenol A are added in the slurry during or after the polymerization step. (Reference should be made to Japanese Patent Provisional Publication No. 66584/1975 and Japanese Patent Publication No. 25277/1976.) Furthermore, many proposals have been made to produce a vinyl chloride polymer system from which monomers are easily removed. (See Japanese Patent Provisional Publication Nos. 21090/1977, 152988/1977 and 102988/1978.). However, the methods disclosed in these earlier publications are not satisfactory.

It is also known to use polyvinyl alcohol and an alkyl cellulose in combination as a dispersing agent or stabilizer. However, satisfactory dispersing effect cannot be attained even when they are added prior to polymerization, since the mechanisms of action thereof at the polymerization step are different from each other. (See Japanese Patent Provisional Publication Nos. 47991/1976 and 5886/1977.) Although the methods of adding polyvinyl alcohol and an alkyl cellulose separately at respective stages of polymerization are known, these methods are disadvantageous in that a special device or a complicated operation is necessitated. (See Japanese Patent Publication Nos. 21670/1976 and 21671/1976.)

OBJECTS AND SUMMARY OF THE INVENTION

An object of the present invention is to provide a stabilizer or dispersing agent for use in a suspension polymerization of a vinyl compound having an excellent dispersibility to sharpen the particle size distribution of the formed polymer particles of the vinyl compound, and to provide a process for preparing a polymer of vinyl compound by the use of said stabilizer or dispersing agent.

Another object of the present invention is to provide a stabilizer or dispersing agent for use in a suspension polymerization of a vinyl compound for forming polymer particles of vinyl compound which have an appropriate apparent specific density, and to provide a process for preparing a polymer of vinyl compound of such kind by the use of said stabilizer or dispersing agent.

A further object of the present invention is to provide a stabilizer or dispersing agent for use in a suspension polymerization of a vinyl compound for forming porous polymer particles of the vinyl compound which are increased in porosity, increased in absorption rate for absorbing a plasticizer, high in gelation speed, and decreased in so-called fish eye, formed in the later molding step, and to provide a process for preparing a polymer of a vinyl compound of such kind by the use of said stabilizer or dispersing agent.

A still further object of the present invention is to provide a stabilizer or dispersing agent for use in a suspension polymerization of a vinyl compound for forming porous polymer particles of a vinyl compound from which monomers contained in the polymer particles may be easily removed, and to provide a process for preparing a polymer of a vinyl compound of this kind by the use of said stabilizer or dispersing agent.

Yet a further object of the present invention is to provide a stabilizer or dispersing agent for use in a suspension polymerization of a vinyl compound for forming a polymer of a vinyl compound which has high electric resistance, and to provide a process for preparing a polymer of a vinyl compound of this kind by the use of said stabilizer or dispersing agent.

Another object of the present invention is to provide a stabilizer or dispersing agent for use in a suspension polymerization of a vinyl compound to form a highly transparent polymer, and to provide a process for preparing a highly transparent polymer of a vinyl compound by the use of said stabilizer or dispersing agent.

The above and other objects and advantages of the present invention will become apparent from the detailed description of the invention given below.

According to the invention, there is provided a stabilizer or dispersing agent for use in a suspension polymerization of a vinyl compound, comprising a modified and partially hydrolyzed polyvinyl alcohol having an average polymerization degree of from 200 to 3,000 and an average hydrolysis degree of from 60 to 90 mol% and including anion hydrophilic groups at the side chains thereof, wherein said anion hydrophilic groups are selected from the group consisting of dicarboxyl groups and/or esters thereof and/or salts thereof, sulfuric esters and/or salts thereof, and phosphoric esters and/or salts thereof, and the content of said anion hydrophilic groups is in the range of 0.02 to 10 mol% per unit mol of the polyvinyl alcohol.

According to another aspect of the present invention, there is provided a process for preparing a polymer of a vinyl compound wherein said vinyl compound is polymerized in a suspension thereof suspended by the use of the aforementioned stabilizer or dispersing agent.

DESCRIPTION OF THE INVENTION

Although the detailed factors affecting the particle size, particle size distribution and porosity of the polyvinyl chloride or like polymers of vinyl compound prepared by a suspension polymerization are not totally clear, it is considered that the dispersibility of the dispersing agent and the protective action of the agent for forming protective colloids are important factors. The dispersibility of the dispersing agent affects the particle size and the stability of oily monomer droplets, and substantially determines the particle size and the particle size distribution. The protective action of the dispersing agent for forming protective colloids affects on the stability of dispersed polymer particles of polyvinyl chloride or the like, and thus determines the bonding property of the formed particles of polyvinyl chloride or the like and the particle size, particle size distribution and porosity of the product.

In order to produce highly porous polyvinyl chloride particles, it is essential that the oily droplets of vinyl chloride monomer be fine to form fine primary polyvinyl chloride particles at the early stage of polymerization and that these fine primary polyvinyl chloride particles are coagulated to form secondary particles which have appropriate porosities and particle sizes. It is also required that the dispersing agent have suitable protective action for forming protective colloids so that the particle size distribution of the resultant particles is sharpened or included in a narrower range.

The stabilizer or dispersing agent according to the present invention, including anion hydrophilic groups introduced at the side chains thereof at a content as defined in the claims and having an average hydrolysis degree as defined in the claims, has an improved dispersive power and an appropriate protective action for forming protective colloids of satisfactory property. If any of the average polymerization degree, the hydrolysis degree and the content of the modifier groups is out of the ranges as defined in the claims, a polymer of a vinyl compound, such as polyvinyl chloride, which is well balanced in various properties, cannot be prepared.

The average polymerization degree of the modified and partially hydrolyzed polyvinyl alcohol used in the present invention should be in the range of 200 to 3,000, preferably in the range of 600 to 1,500 in view of the balance between the water-soluble property and the protective action. The average hydrolysis degree of the modified and partially hydrolyzed polyvinyl alcohol shall be in the range of 60 to 90 mol%, preferably in the range of 60 to 80 mol%.

If the average polymerization degree is less than 200, the protective action becomes too weak. On the contrary, if the average polymerization degree exceeds 3,000, the solubility in water is disadvantageously lowered. If the average hydrolysis degree is less than 60 mol%, the solubility in water becomes insufficient so that the suspension system at the later polymerization step cannot be maintained in a satisfactorily stable condition. If the average hydrolysis degree exceeds 90 mol%, the surface activity of polyvinyl alcohol is lowered resulting in increase in diameters of oily monomer droplets of vinyl chloride or similar vinyl compounds to make it impossible to form porous product polymer particles.

Anion hydrophilic groups are introduced into the polyvinyl alcohol at the side chains thereof. Examples of the introduced anion hydrophilic groups are dicarboxyl groups and/or esters thereof and/or salts thereof, sulfuric esters and/or salts thereof, and phosphoric esters and/or salts thereof.

The anion hydrophilic groups may be introduced by various methods. For example, dicarboxyl groups and/or esters thereof and/or salts thereof may be introduced by the carboxylation method wherein a copolymer of vinyl acetate and an unsaturated dicarboxylic acid and/or an ester thereof is initially prepared and then the copolymer is hydrolyzed. As a result of the hydrolysis, salts of dicarboxyl groups, such as sodium or potassium salts, are necessarily introduced in part. The most preferred unsaturated dicarboxylic acid is maleic acid anhydride. Maleic diesters and maleic monoesters may be preferably used as the esters of maleic acid, the specific examples of maleic diesters and maleic monoesters being dimethyl maleate, monomethyl maleate, diethyl maleate and monoethyl maleate. Maleic esters are more preferable than maleic acid anhydride in view of the copolymerizable properties.

Sulfuric esters and/or salts thereof may be introduced into the polyvinyl alcohol by the sulfonation method in which the polyvinyl alcohol is treated in a concentrated aqueous solution of sulfuric acid or by the chlorosulfonation method in which the OH groups of the polyvinyl alcohol are condensed with chlorosulfonic acid.

Phosphoric esters and/or salts thereof may be introduced into the polyvinyl alcohol by the esterification method in which the polyvinyl alcohol is heated in a concentrated aqueous solution of phosphoric acid or by the esterification method in which the OH groups of the polyvinyl alcohol are condensed with phosphorus oxychloride.

The content of the anion hydrophilic groups should be 0.02 to 10 mol%, preferably 0.02 to 5 mol%, per unit mol of the polyvinyl alcohol. If the content is less than 0.02 mol%, highly porous products, such as porous polyvinyl chloride, cannot be formed. On the contrary, if the content of anion hydrophilic groups exceeds 10 mol%, the surface activity of the dispersing agent becomes excessive so that a proper suspension system of vinyl compound monomers cannot be formed. Rather, an emulsion system of the monomers is formed. Such a dispersing agent having excessive surface activity is not suited for use as a dispersing agent or stabilizer in a suspension polymerization system.

The aforementioned modified and partially hydrolyzed polyvinyl alcohol may be used individually as the stabilizer or dispersing agent according to the present invention. However, to further improve protective power, the modified and partially hydrolyzed polyvinyl alcohol of the invention may contain an unmodified but partially hydrolyzed polyvinyl alcohol having an average polymerization degree of from 200 to 3,000 and an average hydrolysis degree of from 60 to 90 mol%. The average polymerization degree and the average hydrolysis degree of the additional partially hydrolyzed polyvinyl alcohol are limited in the ranges as stated hereinabove for the same reasons as described with regard to the modified and partially hydrolyzed polyvinyl alcohol. The mixing ratio of the modified and partially hydrolyzed polyvinyl alcohol to the additional unmodified partially hydrolyzed polyvinyl alcohol ranges 20–80 wt% to 80–20 wt%, preferably 50–80 wt% to 50–20 wt%.

The stabilizer or dispersing agent of the invention may contain, other than the aforementioned modified and partially hydrolyzed polyvinyl alcohol, one or more of cellulose derivatives and/or a block copolymer of propylene oxide and ethylene oxide. The viscosity at 20° C. of the 2 wt% aqueous solution of the cellulose derivative should be less than 1000 cps.

The aforementioned cellulose derivatives include esterification and etherification products of cellulose in which one or more of three OH groups of the glucose unit are esterified or etherified. Examples of such cellulose derivatives are methyl cellulose, hydroxyethyl cellulose, methylhydroxyethyl cellulose, hydroxypropyl cellulose and hydroxypropylmethyl cellulose. It is essential that the viscosity at 20° C. of the 2 wt% aqueous solution of any of these cellulose derivatives shall be less than 1000 cps. If a cellulose derivative having the viscosity out of the range as defined above is added, the particle size of the product resins, such as polyvinyl chloride resin, becomes coarser or the amount of scale adhering to the polymerization vessel, such as autoclave, is increased and the quality of the product is deteriorated. A hydroxypropylmethyl cellulose having a viscosity at 20° C. of the 2 wt% aqueous solution of less than 1000 cps is particularly suited as an additive contained in the stabilizer or dispersing agent of the invention. Also, a particularly preferred stabilizer or dispersing agent can be prepared by adding a hydroxypropyl cellulose having a viscosity at 20° C. of the 2 wt% aqueous solution of less than 500 cps and a hydroxypropylmethyl cellulose having a viscosity at 20° C. of the 2 wt% aqueous solution of less than 1000 cps. Hydroxypropyl cellulose acts to form minute primary particles of product polymer, such as polyvinyl chloride, at the initial stage of polymerization and thus has an important influence on the porosity of the resultant product. If the viscosity of hydroxypropyl cellulose is too high, minute primary particles are not formed so that the porosity of the product is not improved and the gelation property of the product is deteriorated. However, the hydroxypropyl cellulose which is too low in viscosity is inferior in protective action so that some particles of product polymer coagulate at the later stage of polymerization, and sometimes form too large particles.

Hydroxypropylmethyl cellulose has an important influence on the protective action when it is used in the present invention together with the modified and partially hydrolyzed polyvinyl alcohol. The particle size of the product polymer is decreased as the mixing ratio of hydroxypropylmethyl cellulose is increased. However, if the mixing ratio exceeds a certain limit, the particle size of the product polymer becomes rather coarse and the gelation property thereof is also deteriorated. The protective action is enhanced as the viscosity of hydroxypropylmethyl cellulose is increased so that finer product polymer particles are formed. However, if the viscosity becomes too high beyond a certain limit, the particle size of the formed product polymer becomes coarser and the particle size distribution varies widely.

Preferable block copolymers of propylene oxide and ethylene oxide are those including 40 to 80 wt% of ethylene oxide and having the average molecular weight of polypropylene glycol in the copolymer of 1,700 to 2,000.

In the case where one or more of the aforementioned cellulose derivatives and/or a block copolymer of propylene oxide and ethylene oxide are used, 100 parts by weight of the aforementioned modified and partially hydrolyzed polyvinyl alcohol is mixed with 5 to 150 parts, preferably 5 to 70 parts, more preferably 10 to 50 parts, by weight of said cellulose derivative or derivatives and/or said block copolymer. In the case where both of hydroxypropyl cellulose and hydroxypropylmethyl cellulose are added together, it is preferred that the ratio of hydroxypropyl cellulose to hydroxypropylmethyl cellulose be 5–40 parts to 95–60 parts by weight.

By adding one or more of the cellulose derivatives and/or the block copolymers of propylene oxide and ethylene oxide having the proper composition and the proper viscosity as set forth hereinabove when dissolved in water, the suspension is further stabilized and the product polymer of the vinyl compound is further improved in porosity to facilitate removal of monomers.

The stabilizer or dispersing agent of the invention is well suited for the production of soft polyvinyl chloride resins since the polymer particles formed by the use of the dispersing agent are improved in absorption properties for absorbing a plasticizer. The stabilizer or dispersing agent of the invention may be also used for the production of rigid polyvinyl chloride resins since the polymer particles formed by the use of the dispersing agent are improved in particle size distribution and can be easily deprived of unreacted monomers. The stabilizer or dispersing agent of the invention may be used in a suspension polymerization process in which an aqueous suspension of vinyl chloride is used or a mixture of vinyl chloride and another monomer which is copolymerizable with vinyl chloride is used.

It is preferred that monomers of the vinyl system are polymerized using the stabilizer or dispersing agent of the invention in accordance with the following suspension polymerization processes.

For example, a polyvinyl chloride may be produced by adding 0.01 to 0.3%, preferably 0.02 to 0.1%, by weight of the stabilizer or dispersing agent having the composition as set forth above to vinyl chloride monomers. The mixing ratio of vinyl chloride monomers to water is 1:1 to 1:3, preferably 1:1.3 to 1:2, by weight. As the polymerization initiators which may be used to initiate the suspension polymerization, there may be included organic peroxides such as benzoyl peroxide and lauroyl peroxide, peresters such as tert-propyl peracetate, dialkylperoxydicarbonates such as di-2-ethylhexyl-peroxydicarbonate, azo-compounds such as azobisdimethylvaleronitrile and azobisisobutyronitrile and organic sulfonyl peroxides such as acetylcyclohexylsulfonyl peroxide. These polymerization initiators may be used individually or in combination.

A chain transferring agent may be used to control the polymerization degree of polyvinyl chloride. Examples of the chain transferring agent are saturated hydrocarbons such as n-pentane and n-hexane, chlorinated hydrocarbons such as carbon tetrachloride, trichloroethylene and perchloroethylene, aldehydes such as propionaldehyde and n-butylaldehyde and thio-compounds such as thioglycollic esters and mercapto alcohols. A small amount of surface active agent may be added, as desired.

The suspension polymerization is effected at a temperature of from 30° to 75° C., preferably 50° to 70° C., for 5 to 17 hours, preferably 7 to 15 hours.

EXAMPLES OF THE INVENTION

The present invention will be described in detail with reference to some examples thereof.

Throughout the specification including the following examples and appended claims, "part" and "%" stand for "part by weight" and "% by weight" unless otherwise specified.

The data appearing in the examples are determined by the following test methods.
(1) Bulk Density: JIS-K 6721
(2) Porosity: Using the Porosimeter Model #65 available from CARLO ERBA SpA., which is a mercury press-in type porosimeter, the total volume of pores having radii of 75 to 75,000 Å was determined.
(3) Particle Size Distribution: JIS-Z 8801
(4) Number of Ungelled Particles: 100 parts of polyvinyl chloride, 50 parts of di-2-ethylhexyl phthalate, 2 parts of cadmium stearate, 0.5 parts of titanium white and 0.025 parts of a carbon powder were mixed, put into an eight-inch roller press maintained at 155° C., and kneaded between the rollers for 5 minutes to form a 0.25 mm thick sheet. The number of ungelled particles contained in a square of 10 cm × 10 cm was counted.
(5) Gelation Speed: 100 parts of polyvinyl chloride, 50 parts of di-2-ethylhexyl adipate, 5 parts of an epoxidated soybean oil (0-130P, produced by Adeka-Argus Chemical Co., Ltd.), 3 parts of a Ca-Zn system stabilizer (Mark 37, produced by Adeka-Argus Chemical Co., Ltd.), 0.5 parts of a lubricant (Calochol #86, produced by Kao Soap Co., Ltd.), 0.8 parts of barium stearate, 0.5 part of titanium white and 0.05 parts of a carbon powder were mixed, put into an eight-inch roller press maintained at 145° C. and kneaded for a pre-set time to form a 0.25 mm thick sheet. The number of ungelled particles contained in a square of 20 cm × 10 cm was counted.
(6) Absorption Property for Absorbing Plasticizer Determined by the Use of Planetary Mixer: 400 grams of polyvinyl chloride was put into a planetary mixer (P-600 Model, produced by Brabender OHG DUISBURG) preheated at 90° C. for 6 minutes, added with 320 grams of di-2-ethylhexyl phthalate and the mixed at 90° C. The variation in torque was recorded. The torque was abruptly increased when the plasticizer was added to reach the peak value. The torque was maintained at that peak level for a while and then abruptly lowered. The plasticizer was completely absorbed by polyvinyl chloride particles by the moment at which the torque was abruptly lowered (this being referred to as dry-up point) and then the torque was maintained at a constant value. The absorption rate for absorbing the plasticizer was represented by the period from the time at which the plasticizer was added to the dry-up point.
(7) Residual Monomer: Each of the polyvinyl chloride polymers prepared in the Examples and Comparative Examples was dehydrated and dried (100 grams of polyvinyl chloride powder was put into a Geer's oven and dried at 60° C. for 12 hours). Then, the dried powder was put into a heating furnace (PYROLYZER, the PYR-1A Model, produced by Shimadzu Seisakusho Ltd.) and heated at a temperature at which the polymer would not thermally decompose to evaporate the vinyl chloride monomers. The evaporated vinyl chloride monomers were introduced into a gas chromatograph (the GC-163 Model, produced by Hitachi, Ltd.) together with a carrier gas to be subjected to analysis.
(8) Volume Resistivity:
  100 parts of polyvinyl chloride, 50 parts of dioctyl phthalate, 3 parts of lead tristearate, and 1 part of barium stearate were put into an eight-inch roller press maintained at 165° C. and kneaded for 10 minutes to form a 1.2 mm thick sheet.
  The sheet was put into a mold having a thickness of 1 mm and dimensions of 130×160 mm, and pressed by a press plate maintained at 165° C. under a pressure of 200 kg/cm² to form a test specimen. Using the High Resistance Meter 4329A Model produced by Yokokawa Huret Packer Co. and generally in accordance with the JIS-K-6723 Method, the volume resistivity of the test specimen was determined.

(9) Transparency:

100 parts of polyvinyl chloride, 2 parts of mercapto-Sn and 0.5 parts of stearic acid were put into a eight-inch roller press maintained at 160° C. and kneaded for 5 minutes to form a 0.40 mm thick sheet.

Three plies of this sheet were pressed by a press plate at 180° C. for 5 minutes under a pressure of 50 kg/cm² to form an integral sheet of 1 mm in thickness. The percent transmission of all light rays transmitted through the later mentioned sheet was measured using an apparatus of integrating sphere type manufactured in accordance with the JIS-6717 Method for measuring the percent transmission of light ray.

EXAMPLE 1

75 Parts of vinyl acetate, 25 parts of methanol, 1.5 parts of dimethyl maleate and 0.08 wt%, based on the weight of vinyl acetate, of azobisisobutyronitrile were charged into a polymerization vessel, purged with nitrogen and heated to the boiling point at which polymerization was contained until the polymerization degree reached 80%. Then, unreacted monomers were removed by the conventional method to obtain a copolymer which was hydrolyzed by the conventional method using NaOH to obtain a modified and partially hydrolyzed polyvinyl alcohol having a polymerization degree of 1,100 and a hydrolysis degree of 72 mol% and including 1.5 mol% of dicarboxyl groups.

6400 kg of water, 2.8 kg of the aforementioned modified polyvinyl alcohol, 0.6 kg of diethylhexylperoxydicarbonate and 0.6 kg of azobisdimethylvaleronitrile were charged in a 15 m³ volume autoclave. The later mentioned two compounds were added as the polymerization initiators. After the autoclave was evacuated, 5900 kg of vinyl chloride monomer was added. The mixing ratio of the polyvinyl alcohol relative to the vinyl chloride monomer amounted to 0.047 wt%. The reaction mixture was agitated at 57° C. for 10 hours to polymerize the vinyl chloride monomer. After the completion of polymerization, the unreacted gaseous components contained in the autoclave were discharged from the system, and the formed polyvinyl chloride slurry was dehydrated by means of centrifugal separation and dried to obtain 5100 kg of polyvinyl chloride. The properties of the thus obtained polyvinyl chloride are shown in Table 1.

EXAMPLE 2

A copolymer of polyvinyl acetate and maleic ester containing 1.0 mol% of dicarboxyl groups was prepared similarly as in Example 1. This copolymer were subjected to alcoholyses to obtain four kinds of modified polyvinyl alcohols each having a different alcoholysis degree ranging within 60 mol% to 80 mol%. Using each of these modified and partially alcoholyzed polyvinyl alcohols, the suspension polymerization of vinyl chloride was carried out under the same conditions as in Example 1. The properties of the resultant polyvinyl chlorides are shown in Table 1.

COMPARATIVE EXAMPLE 1

In order to clearly show the advantages of the present invention, comparative experiments were conducted in which vinyl chloride were polymerized by suspension polymerization similarly as in Example 1 but using the following three stabilizers or dispersing agents.

(1) A polyvinyl alcohol having a polymerization degree of 1,170 and a hydrolysis degree of 71.3 mol%; and (2) A modified polyvinyl alcohol having a polymerization degree of 220 and a hydrolysis degree of 5.0 mol% and containing 50.4 mol% of maleic ester.

(3) A modified polyvinyl alcohol having a polymerization degree of 1,050 and a hydrolysis degree of 56 mol% and containing 4.0 mol% of crotonic acid.

The results of these comparative experiments are shown in Table 1.

TABLE 1

|  | Example 1 | Example 2 (1) | Example 2 (2) | Example 2 (3) | Example 2 (4) |
|---|---|---|---|---|---|
| Properties of the Used PVA | | | | | |
| Modification Means | Copolymerized with Maleic Ester | Copolymerized with Maleic Ester | Copolymerized with Maleic Ester | Copolymerized with Maleic Ester | Copolymerized with Maleic Ester |
| Amount of Modifier (mol %) | 1.5 | 1.0 | 1.0 | 1.0 | 1.0 |
| Polymerization Degree | 1,100 | 1,150 | 1,150 | 1,150 | 1,150 |
| Hydrolysis Degree (mol %) | 72.0 | 60.8 | 70.5 | 73.8 | 78.6 |
| Properties of the Resultant PVC | | | | | |
| Bulk Density (g/cc) | 0.52 | 0.50 | 0.52 | 0.50 | 0.51 |
| Average Particle Size (micron) | 132 | 125 | 120 | 122 | 127 |
| Particle Size Distribution  Larger than 80 meshes | 0.5 | 0.9 | 0.8 | 0.6 | 1.2 |
| (wt %)   Smaller than 200 meshes | 0.2 | 0.5 | 0.6 | 0.3 | 0.9 |
| Number of Ungelled Particles | 2 | 2 | 4 | 1 | 3 |
| Gelation   Kneaded for 4 min. | 37 | 32 | 40 | 27 | 30 |
| Speed      Kneaded for 6 min. | 2 | 1 | 5 | 2 | 1 |
| Volume of Pores (cc/g) | 0.44 | 0.41 | 0.40 | 0.41 | 0.44 |
| Absorptive Property for Absorbing Plasticizer (min.) | 7.2 | 7.5 | 7.9 | 7.7 | 7.9 |
| Residual Monomer (ppm) | 0.6 | 0.7 | 0.9 | 0.9 | 1.0 |

|  | Comparative Example 1 (1) | Comparative Example 1 (2) | Comparative Example 1 (3) |
|---|---|---|---|
| Properties of the Used PVA | | | |
| Modification Means | None | Copolymerized with Maleic Ester | Copolymerized with Crotonic Acid |

TABLE 1-continued

| | | | |
|---|---|---|---|
| Amount of Modifier (mol %) | None | 50.4 | 4.0 |
| Polymerization Degree | 1,170 | 220 | 1,050 |
| Hydrolysis Degree (mol %) | 71.3 | 5.0 | 56.0 |
| Properties of the Resultant PVC | | | |
| Bulk Density (g/cc) | 0.48 | 0.42 | 0.45 |
| Average Particle Size (micron) | 124 | 125 | 128 |
| Particle Size | | | |
| Distribution      Larger than 80 meshes | 5.5 | 8.6 | 2.8 |
| (wt %)              Smaller than 200 meshes | 2.3 | 2.2 | 3.0 |
| Number of Ungelled Particles | 10 | 21 | 13 |
| Gelation    Kneaded for 4 min. | 950 | 1,500 | 1,200 |
| Speed       Kneaded for 6 min. | 57 | 140 | 250 |
| Volume of Pores (cc/g) | 0.35 | 0.30 | 0.32 |
| Absorptive Property for Absorbing | | | |
| Plasticizer (min.) | 10.3 | 9.5 | 9.2 |
| Residual Monomer (ppm) | 11 | 22 | 15 |

Note:
PVA means polyvinyl alcohol and PVC means polyvinyl chloride.

EXAMPLE 3

75 Parts of vinyl acetate and 2 parts of dimethyl maleate were copolymerized by the conventional solution polymerization process. The formed copolymer of vinyl acetate and dimethyl maleate was hydrolyzed by the conventional method to obtain a modified and partially hydrolyzed polyvinyl alcohol (A) (see Table 2). The obtained modified and partially hydrolyzed polyvinyl alcohol (A) had an average polymerization degree of 1,680 and a hydrolysis degree of 71.6 mol% and contained 2.0 mol% of dicarboxyl groups.

6100 kg of water, 1.5 kg of the modified and partially hydrolyzed polyvinyl alcohol (A), 1.5 kg of a partially hydrolyzed polyvinyl alcohol (B) (see Table 2) having an average polymerization degree of 2,430 and a hydrolysis degree of 79.5 mol%, 0.6 kg of di-2-ethylhexyl-peroxydicarbonate and 0.6 kg of 2-2'-azobis(2,4-dimethylvaleronitrile) were charged into a stainless steel autoclave of 15 m³ in volume. The last mentioned two compounds were added as the polymerization initiators. After the autoclave was evacuated, 6100 kg of vinyl chloride monomer was added and then polymerized at 57° C. for 10 hours while agitating. When the pressure in the autoclave reached 5.5 kg/cm², the unreacted gaseous components in the autoclave were discharged out of the system and the resultant polyvinyl chloride slurry was dehydrated by means of centrifugal separation and dried. The properties of the resultant polyvinyl chloride are shown in Table 2.

EXAMPLE 4

A polyvinyl alcohol having a polymerization degree of 1,200 and a hydrolysis degree of 70.5 mol% was reacted with chlorosulfonic acid in pyridine. The formed polyvinyl alcohol partially modified with pyridine salt of sulfuric ester was neutralized to obtain a modified and partially hydrolyzed polyvinyl alcohol (A) containing 1 mol% of sulfuric ester.

Similarly as in Example 3, vinyl chloride was polymerized using a stabilizer or dispersing agent composed of the aforementioned modified and partially hydrolyzed polyvinyl alcohol (A) and an additional partially hydrolyzed polyvinyl alcholol (B) having a polymerization degree of 1,170 and a hydrolysis degree of 71.3 mol%. The properties of the resultant polyvinyl chloride are shown in Table 2.

EXAMPLE 5

A polyvinyl alcohol having a polymerization degree of 1,200 and a hydrolysis degree of 50 mol% was reacted with a 62% solution of phosphoric acid in benzene, and then neutralized to obtain a modified and partially hydrolyzed polyvinyl alcohol (A) having a polymerization degree of 1,200 and a hydrolysis degree of 78 mol% and containing 0.05 mol% of phosphoric ester. Similarly as in Example 3, vinyl chloride was polymerized using a stabilizer or dispersing agent composed of the aforementioned modified and partially hydrolyzed polyvinyl alcohol (A) and an additional partially hydrolyzed polyvinyl alcohol (B) having a polymerization degree of 1,170 and a hydrolysis degree of 71.3 mol%. The properties of the resultant polyvinyl chloride are shown in Table 2.

EXAMPLE 6

Similarly as in Example 3, a modified polyvinyl alcohol containing 1.0 mol% of dicarboxyl groups was prepared. From this modified polyvinyl alcohol three kinds of modified and partially hydrolyzed polyvinyl alcohols (A) were prepared, each having a different hydrolysis degree within 60 mol% to 90 mol%. Each of these modified and partially hydrolyzed polyvinyl alcohols (A) was mixed with the partially hydrolyzed polyvinyl alcohol (B) as set forth in Example 3 and used in a suspension polymerization of vinyl chloride similarly as in Example 3. The properties of the resultant polyvinyl chlorides are shown in Table 2.

COMPARATIVE EXAMPLE 2

In order to clearly show the advantages of the present invention, comparative experiments were conducted in which vinyl chloride were polymerized by suspension polymerization similarly as Example 3 except in the following two stabilizers or dispersing agents were used.

(1) A polyvinyl alcohol having a polymerization degree of 2,430 and a hydrolysis degree of 79.5 mol%.

(2) A polyvinyl alcohol having a polymerization degree of 1,170 and a hydrolysis degree of 71.3 mol%.

The results of these comparison experiments are also shown in Table 2.

TABLE 2

| | Example 3 | Example 4 | Example 5 |
|---|---|---|---|

TABLE 2-continued

| | | | Copolymerized with Maleic Ester | Esterified by surfuric Acid | Esterified by Phosphoric Acid |
|---|---|---|---|---|---|
| Stabilizer for the Suspension | Modified PVA (A) | Modification Means | Copolymerized with Maleic Ester | Esterified by surfuric Acid | Esterified by Phosphoric Acid |
| | | Amount of Modifier (mol %) | 2.0 | 1.0 | 0.05 |
| | | Average Polymerization Degree | 1,680 | 1,200 | 1,200 |
| | | Hydrolysis Degree (mol %) | 71.6 | 70.5 | 78.0 |
| | Partially Hydrolyzed PVA (B) | Average Polymerization Degree | 2,430 | 1,170 | 1,170 |
| | | Hydrolysis Degree (mol %) | 79.5 | 71.3 | 71.3 |
| | | (A)/(B) | 1.0 | 1.0 | 1.0 |
| Properties of the Resultant PVC | | Bulk Density (g/cc) | 0.55 | 0.55 | 0.54 |
| | Particle Size Distribution (wt %) | Larger than 80 meshes | 0.3 | 0.5 | 0.6 |
| | | Smaller than 200 meshes | 0.2 | 0.3 | 0.3 |
| | | Average Particle Size (micron) | 129 | 125 | 120 |
| | | Number of Ungelled Particles | 1 | 2 | 2 |
| | Gelation Speed | Kneaded for 4 min. | 35 | 25 | 20 |
| | | Kneaded for 6 min. | 3 | 3 | 5 |
| | | Absorptive Property for Absorbing Plasticizer (min.) | 6.7 | 6.9 | 7.0 |
| | | Volume of Pores (cc/g) | 0.44 | 0.41 | 0.40 |
| | | Residual Monomer (ppm) | 0.4 | 0.6 | 0.6 |

| | | | Example 6 | | | Comparative Ex. 2 | |
|---|---|---|---|---|---|---|---|
| | | | (1) | (2) | (3) | (1) | (2) |
| Stabilizer for the Suspension | Modified PVA (A) | Modification Means | Copolymerized with Maleic Ester | Copolymerized with Maleic Ester | Copolymerized with Maleic Ester | | |
| | | Amount of Modifier (mol %) | 1.0 | 1.0 | 1.0 | | |
| | | Average Polymerization Degree | 1,120 | 1,120 | 1,120 | | |
| | | Hydrolysis Degree (mol %) | 61.2 | 70.5 | 85.7 | | |
| | Partially Hydrolyzed PVA (B) | Average Polymerization Degree | 2,430 | 2,430 | 2,430 | 2,430 | 1,170 |
| | | Hydrolysis Degree (mol %) | 79.5 | 79.5 | 79.5 | 79.5 | 71.3 |
| | | (A)/(B) | 1.5 | 1.5 | 1.5 | — | — |
| Properties of the Resultant PVC | | Bulk Density (g/cc) | 0.55 | 0.55 | 0.54 | 0.52 | 0.50 |
| | Particle Size Distribution (wt %) | Larger than 80 meshes | 0.2 | 0.2 | 0.4 | 2.2 | 2.0 |
| | | Smaller than 200 meshes | 0.2 | 0.1 | 0.1 | 2.8 | 1.0 |
| | | Average Particle Size (micron) | 123 | 133 | 125 | 137 | 126 |
| | | Number of Ungelled Particles | 1 | 1 | 1 | 50 | 40 |
| | Gelation Speed | Kneaded for 4 min. | 10 | 13 | 25 | 1,700 | 900 |
| | | Kneaded for 6 min. | 3 | 2 | 3 | 53 | 45 |
| | | Absorptive Property for Absorbing Plasticizer (min.) | 6.7 | 6.9 | 7.2 | 10.5 | 8.9 |
| | | Volume of Pores (cc/g) | 0.44 | 0.45 | 0.42 | 0.30 | 0.34 |
| | | Residual Monomer (ppm) | 0.5 | 0.5 | 0.6 | 15 | 11 |

Note:
PVA means polyvinyl alcohol and PVC means polyvinyl chloride.

EXAMPLE 7

75 Parts of vinyl acetate, 25 parts of methanol, 1.5 mol% of dimethyl maleate per unit mol of vinyl acetate, and 0.08% of azobisisobutyronitrile were charged into a polymerization vessel provided with a heater, an agitator, and a reflux condenser. After the polymerization vessel was purged with nitrogen, the reaction mixture was heated to the boiling point at which polymerization was continued until the porimerization degree reached 80%. Then, unreacted monomers were removed by the conventional method to obtain a copolymer. 0.025 mol equivalent of NaOH (10% solution in methanol) per unit mol of the copolymer was added to the copolymer and then a mixture composed of 35% of the copolymer, 63% of methanol, and 2% of water was prepared and subjected to alcoholysis at 35° C. As a result, a modified and partially hydrolyzed polyvinyl alcohol having a polymerization degree of 1,100 and a hydrolysis degree of 72 mol% and containing 1.5 mol% of dicarboxyl groups was obtained.

10 g of di-2-ethylhexyl-peroxydicarbonate and 10 g of 2,2'-azobis(2,4-dimethyl-valeronitrile) and 120 kg of pure water were charged into a stainless steel autoclave of 300 liters in volume, and added with a stabilizer or dispersing agent composed of 40 g of the aforementioned modified and partially hydrolyzed polyvinyl alcohol, 10 g of a hydroxypropylmethyl cellulose (Metholose 60SH-50, produced by Shin-etsu Chemical Co., Ltd.) having a viscosity at 20° C. of the 2.0 wt% aqueous solution of 50 cps, and 4 g of a hydroxypropyl cellulose (HPC-SL, produced by Nippon Soda Co., Ltd.) having a viscosity at 20° C. of the 2.0 wt% aqueous solution of 5.0 cps. After the autoclave was evacuated, 100 kg of vinyl chloride was introduced in the autoclave and polymerized at 55° C. while agitating. After the pressure in the autoclave was adjusted to 5 kg/cm$^2$G, the unreacted vinyl chloride monomers were removed and the formed polyvinyl chloride slurry was dehydrated using a centrifugal separator and then dried in a drier. The properties of the resultant polymer are shown in Table 3.

EXAMPLE 8

Sodium pyridinesulfonate was prepared from pyridine and chlorosulfonic acid and added to a polyvinyl alcohol having a polymerization degree of 1,200 and a hydrolysis degree of 70 mol% in pyridine to form a polyvinyl alcohol partially modified with pyridine salt of sulfuric ester, which was neutralized to obtain a modified and partially hydrolyzed polyvinyl alcohol containing sulfuric acid in an addition ratio of 1 mol% per unit mol of polyvinyl alcohol. Using the obtained modified and partially hydrolyzed polyvinyl alcohol in place of the modified and partially hydrolyzed polyvinyl alcohol as in Example 7, vinyl chloride was polymerized similarly as in Example 7 except that 2 g of a hydroxypropyl cellulose (HPC-L, produced by Nippon Soda Co., Ltd.) having a viscosity at 20° C. of the 2.0 wt% aqueous solution of 7.0 cps was used in place of the hydroxypropyl cellulose in Example 7. The properties of the resultant polymer are shown in Table 3.

EXAMPLE 9

A polyvinyl alcohol having a polymerization degree of 1,200 and a hydrolysis degree of 50 mol% was reacted with a 62 wt% solution of phosphoric acid in benzene and then neutralized to obtain a modified and partially hydrolyzed polyvinyl alcohol having a polymerization degree of 1,200 and a hydrolysis degree of 78 mol% and containing 0.05 mol% of phosphoric acid per unit mol of polyvinyl alcohol. Using a stabilizer or dispersing agent composed of 50 g of the aforementioned modified and partially hydrolyzed polyvinyl alcohol, 8 g of a hydroxypropylmethyl cellulose (Metholose 90SH-100, produced by Shin-etsu Chemical Co., Ltd.) having a viscosity at 20° C. of the 2.0 wt% aqueous solution of 100 cps, and 2 g of hydroxypropyl cellulose (KLUCEL G, produced by Hercules Inc.) having a viscosity at 20° C. of the 2.0 wt% aqueous solution of 200 cps, vinyl chloride was polymerized in accordance with the general procedure as described in Example 7. The properties of the resultant polymer are shown in Table 3.

EXAMPLE 10

A polyvinyl chloride was produced similarly as Example 7 except in that a stabilizer or dispersing agent composed of 35 g of the modified and partially hydrolyzed polyvinyl alcohol as set forth in Example 7, 16 g of the hydroxypropylmethyl cellulose and 3 g of the hydroxypropyl cellulose were used. The properties of the resultant polymer are shown in Table 3.

EXAMPLE 11

A polyvinyl chloride was produced similarly as in Example 7 except that a stabilizer or dispersing agent composed of 35 g of the modified and partially hydrolyzed polyvinyl alcohol as set forth in Example 7 and 19 g of the hydroxypropylmethyl cellulose was used. The properties of the resultant polymer are shown in Table 3.

TABLE 3

| Test Item | | 7 | 8 | 9 | 10 | 11 |
|---|---|---|---|---|---|---|
| Bulk Density (g/cc) | | 0.54 | 0.55 | 0.53 | 0.55 | 0.56 |
| Volume of Pores (cc/g) | | 0.46 | 0.43 | 0.45 | 0.46 | 0.45 |
| Particle Size Distribution | Larger than 250 microns | 0 | 0 | 0 | 0 | 0 |
| | Smaller than 74 microns | 0.2 | 0.1 | 0.4 | 0.1 | 0.1 |
| Number of Ungelled Particles | | 0 | 0 | 0 | 0 | 0 |
| Gelation Speed (Number of Ungelled Particles) | Kneaded for 3 min. | 20 | 15 | 20 | 15 | 20 |
| | Kneaded for 5 min. | 0 | 0 | 1 | 0 | 0 |

EXAMPLE 12

A modified and partially hydrolyzed polyvinyl alcohol was prepared similarly as in Example 7.

5 g of di-2-ethylhexyl-peroxy-dicarbonate, 5 g of 2,2′-azobis(2,4-dimethylvaleronitrile), 180 kg of pure water, 35 g of the aforementioned modified and partially hydrolyzed polyvinyl alcohol and 15 g of a hydroxypropylmethyl cellulose (Metholose 60SH-50, produced by Shin-etsu Chemical Industry Co., Ltd.) having a viscosity at 20° C. of the 2.0 wt% aqueous solution of 50 cps, were charged into a stainless steel autoclave of 300 liters in volume. After the autoclave was evacuated, 60 kg of vinyl chloride monomer was introduced into the autoclave and polymerized at 57° C. while agitating. After the pressure in the autoclave was adjusted to 5.0 kg/cm$^2$·G, the unreacted monomers were removed out of the system and the formed polyvinyl chloride slurry was dehydrated by centrifugal separation and dried in a drier. The concentration of residual monomer was measured. The results are shown in Table 4.

EXAMPLE 13

A similar procedure as in Example 12 was repeated except that 15 g of a block copolymer of propylene oxide and ethylene oxide (Pronon, produced by Nippon Oil and Fats Company Limited, containing 80% of ethylene oxide and the average molecular weight of polypropylene glycol being 2,000) was used in place of the hydroxypropyl cellulose. The results are shown in Table 4.

EXAMPLE 14

A similar procedure was repeated as in Example 12 except that 10 g of the same hydroxypropyl cellulose as used in Example 12 and 5 g of the same block copolymer of propylene oxide and ethylene oxide in Example 13 were used. The results are shown in Table 4.

EXAMPLE 15

A similar procedure was repeated as in Example 14 except that 10 g of a hydroxyethyl cellulose (AH-15, produced by Fuji Chemical K.K.) having a viscosity at 20° C. of the 2 wt% aqueous solution of 900 cps was used in place of the hydroxypropyl cellulose. The results are shown in Table 4.

COMPARATIVE EXAMPLE 3

A similar procedure was repeated as in Example 12 except that a conventional unmodified but partially hydrolyzed polyvinyl alcohol having a polymerization degree of 1,250 and a hydrolysis degree of 73 mol% was used in place of the modified and partially hydrolyzed polyvinyl alcohol in Example 7. The results are shown in Table 4.

COMPARATIVE EXAMPLE 4

A similar procedure was repeated as in Example 12 except that 40 g of a conventional unmodified but partially hydrolyzed polyvinyl alcohol having a polymerization degree of 2,400 and a hydrolysis degree of 79 mol% and 8 g of the block copolymer of propylene oxide and ethylene oxide in Example 14 were used. The results are shown in Table 4.

TABLE 4

|  | Example | | | | Comparative Example | |
|---|---|---|---|---|---|---|
|  | 12 | 13 | 14 | 15 | 3 | 4 |
| Bulk Density (g/cc) | 0.52 | 0.51 | 0.51 | 0.53 | 0.50 | 0.48 |
| Volume of Pores (cc/g) | 0.44 | 0.46 | 0.45 | 0.42 | 0.32 | 0.33 |
| Residual Monomer (ppm) | below 1 | below 1 | below 1 | below 1 | 8 | 10 |

EXAMPLE 16

A modified and partially hydrolyzed polyvinyl alcohol was prepared similarly as in Example 7.

5 g of di-2-ethylhexyl-peroxydicarbonate, 5 g of 2,2'-azobis(2,4-dimethylvaleronitrile), 180 kg of pure water and 40 g of the aforementioned modified and partially hydrolyzed polyvinyl alcohol were charged into a stainless steel autoclave of 300 liters in volume. After the autocalve was evacuated by the conventional method, 60 kg of vinyl chloride monomer was introduced into the autoclave and polymerized at 57° C. while agitating. Then the pressure in the autoclave was adjusted to 5.0 kg/cm$^2$·G and the unreacted monomers were removed out of the system. The formed polyvinyl chloride slurry was dehydrated using a separator and then dried in a drier. The properties of the resultant polyvinyl chloride are shown in Table 5.

EXAMPLE 17

A sodium pyridinesulfonate was prepared from pyridine and chlorosulfonic acid and added to a polyvinyl alcohol having a polymerization degree of 1,200 and a hydrolysis degree of 70 mol% in pyridine to form a polyvinyl alcohol partially modified with pyridine salt of sulfuric ester which was neutralized to obtain a modified and partially hydrolyzed polyvinyl alcohol containing sulfuric acid in an addition ratio of 1 mol% per unit mol of polyvinyl alcohol. Similarly as in Example 16, but using 40 g of the thus obtained modified and partially hydrolyzed polyvinyl alcohol, vinyl chloride monomer was polymerized to obtain a polyvinyl chloride. The properties of the resultant polyvinyl chloride are shown in Table 5.

EXAMPLE 18

A polyvinyl alcohol having a polymerization degree of 1,200 and a hydrolysis degree of 50 mol% was reacted with a 62% solution of phosphoric acid in benzene, and then neutralized to obtain a modified and partially hydrolyzed polyvinyl alcohol having a polymerization degree of 1,200 and a hydrolysis degree of 78 mol% and containing 0.05 mol% of phosphoric acid. A similar procedure was repeated as Example 16 except in that 40 g of the aforementioned modified and partially hydrolyzed polyvinyl alcohol was used. The properties of the resultant polyvinyl chloride are shown in Table 5.

EXAMPLE 19

A modified polyvinyl alcohol containing 1.0 mol% of dicarboxyl groups was prepared. From this modified polyvinyl alcohol, four kinds of modified and partially hydrolyzed polyvinyl alcohols were prepared, each having a different hydrolysis degree within 60 mol% to 80 mol%, by controlling the alcoholysis degree. Using each of these modified and partially hydrolyzed polyvinyl alcohols, vinyl chloride monomer was polymerized similarly as in Example 16. The properties of the resultant polymers are shown in Table 5.

COMPARATIVE EXAMPLE 5

In order to clearly show the advantages of the present invention, comparative experiments were conducted in which vinyl chloride was polymerized similarly as in Example 16 except that the following two conventional stabilizers or dispersing agents were used.
(1) A polyvinyl alcohol having a polymerization degree of 2,430 and a hydrolysis degree of 79.5 mol%;
(2) A polyvinyl alcohol having a polymerization degree of 1,170 and a hydrolysis degree of 71.3 mol%.

TABLE 5

|  |  | Example 16 | Example 17 | Example 18 | Example 19 | |
|---|---|---|---|---|---|---|
|  |  |  |  |  | (1) | (2) |
| Properties of the Used PVA | Modification Means | Copolymerized with Maleic Ester | Esterified by Surfuric Acid | Esterified by Phosphoric Acid | Copolymerized with Maleic Ester | Copolymerized with Maleic Ester |
|  | Amount of Modifier (mol %) | 1.5 | 1.0 | 0.05 | 1.0 | 1.0 |
|  | Average Polymerization Degree | 1,100 | 1,200 | 1,200 | 1,150 | 1,150 |
|  | Hydrolysis Degree (mol %) | 70.0 | 71.0 | 77.5 | 60.6 | 70.2 |
|  | Cloud Point (°C.) | None | None | None | None | None |
| Properties of the Resultant PVC | Bulk Density (g/cc) | 0.51 | 0.52 | 0.51 | 0.50 | 0.50 |
|  | Volume of Pores (cc/g) | 0.41 | 0.42 | 0.40 | 0.39 | 0.42 |
|  | Number of Ungelled Particles | 1 | 1 | 2 | 1 | 1 |
|  | Gelation Kneaded for 4 min. | 20 | 20 | 25 | 20 | 30 |
|  | Speed Kneaded for 6 min. | 0 | 0 | 2 | 0 | 3 |
|  | Volume Resistivity (Ω·cm) × 10$^{14}$ | 2.3 | 2.3 | 2.2 | 2.3 | 2.1 |
|  | Percentage Transmission (%) | 90 | 89 | 89 | 90 | 89 |

|  |  | Example 19 (cont'd) | | Comparative Example 5 | |
|---|---|---|---|---|---|
|  |  | (3) | (4) | (1) | (2) |
| Properties of the Used PVA | Modification Means | Copolymerized with Maleic Ester | Copolymerized with Maleic Ester |  |  |
|  | Amount of Modifier (mol %) | 1.0 | 1.0 |  |  |
|  | Average Polymerization Degree | 1,150 | 1,150 | 2,430 | 1,170 |
|  | Hydrolysis Degree (mol %) | 73.6 | 78.4 | 79.3 | 71.1 |
|  | Cloud Point (°C.) | None | None | 40 | 26 |

TABLE 5-continued

| | | | | | |
|---|---|---|---|---|---|
| Properties of the Resultant PVC | Bulk Density (g/cc) | 0.51 | 0.50 | 0.48 | 0.49 |
| | Volume of Pores (cc/g) | 0.39 | 0.41 | 0.33 | 0.35 |
| | Number of Ungelled Particles | 2 | 2 | 9 | 10 |
| | Gelation Speed Kneaded for 4 min. | 20 | 20 | 1,200 | 1,000 |
| | Kneaded for 6 min. | 0 | 1 | 45 | 37 |
| | Volume Resistivity ($\Omega \cdot cm$) × $10^{14}$ | 2.3 | 2.3 | 1.8 | 1.9 |
| | Percentage Transmission (%) | 90 | 90 | 86 | 87 |

Note:
PVA means polyvinyl alcohol and PVC means polyvinyl chloride.

Although the present invention has been described with reference to the specific examples thereof, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A stabilizer or dispersing agent for use in a suspension polymerization of a vinyl compound, comprising a modified and partially hydrolyzed polyvinyl alcohol having an average polymerization degree of from 200 to 3,000 and an average hydrolysis degree of from 60 to 90 mol% and including anion hydrophilic groups at the side chains thereof, wherein said anion hydrophilic groups are selected from the group consisting of dicarboxyl groups, and/or esters, and/or salts thereof, sulfuric esters and/or salts thereof, and phosphoric esters and/or salts thereof, and mixtures thereof, and the content of said anion hydrophilic groups is in the range of from 0.02 to 10 mol% per unit mol of the polyvinyl alcohol.

2. A stabilizer or dispersing agent as claimed in claim 1, wherein said dicarboxyl groups, and/or esters, and/or salts thereof are introduced into the polyvinyl alcohol by initially preparing a copolymer of vinyl acetate and at least one of an unsaturated dicarboxylic acid and an ester thereof, and then hydrolyzing said copolymer.

3. A stabilizer or dispersing agent as claimed in claim 2, wherein said unsaturated dicarboxylic acid and/or ester thereof is selected from the group consisting of maleic acid anhydride, maleic diesters and maleic monoesters and mixtures thereof.

4. A stabilizer or dispersing agent as claimed in claim 3, wherein said ester of unsaturated dicarboxylic acid is selected from the group consisting of dimethyl maleate, monomethyl maleate, diethyl maleate and monoethyl maleate.

5. A stabilizer or dispersing agent as claimed in claim 1, wherein said sulfuric esters and/or salts thereof are introduced into polyvinyl alcohol by the sulfonation method in which polyvinyl alcohol is treated in a concentrated aqueous solution of sulfuric acid.

6. A stabilizer or dispersing agent as claimed in claim 1, wherein said sulfuric ester and/or salts thereof are introduced into polyvinyl alcohol by the chlorosulfonation method in which the OH groups of polyvinyl alcohol are condensed with chlorosulfuric acid.

7. A stabilizer or dispersing agent as claimed in claim 1, wherein said phosphoric esters and/or salts thereof are introduced into polyvinyl alcohol by the esterification method in which polyvinyl alcohol is heated in a concentrated aqueous solution of phosphoric acid.

8. A stabilizer or dispersing agent as claimed in claim 1, wherein said phosphoric esters and/or salts thereof are introduced into polyvinyl alcohol by the esterification method in which the OH groups of polyvinyl alcohol are condensed with phosphorus oxychloride.

9. The stabilizer or dispersing agent of claim 1 wherein the polyvinyl alcohol has an average polymerization degree of from 600 to 1,500.

10. The stabilizer or dispersing agent of claim 9 wherein the polyvinyl alcohol has an average hydrolysis degree of from 60 to 80 mol %.

11. The stabilizer or dispersing agent of claim 10 wherein said anion hydrophilic groups are in the range of 0.02 to 5 mol % per unit mol of the polyvinyl alcohol.

* * * * *